United States Patent

Kresock

[15] 3,654,384

[45] Apr. 4, 1972

[54] APPARATUS FOR MODIFYING ELECTRICAL SIGNALS

[72] Inventor: John M. Kresock, Fort Wayne, Ind.

[73] Assignee: The Magnavox Company, Fort Wayne, Ind.

[22] Filed: May 25, 1970

[21] Appl. No.: 40,239

[52] U.S. Cl. .................................... 178/5.4 HE, 178/5.4 SD

[51] Int. Cl. ........................................................ H04n 9/12

[58] Field of Search ...................... 178/5.4 HE, 5.4 SD, 5.4 R

[56] References Cited

UNITED STATES PATENTS

| | | | |
|---|---|---|---|
| 3,525,802 | 8/1970 | Whiteneir | 178/5.4 |
| 2,888,514 | 5/1959 | Pritchard | 178/5.4 |

*Primary Examiner*—Richard Murray

*Assistant Examiner*—Peter M. Pecori

*Attorney*—Richard T. Seeger and Pendleton, Neuman, Williams & Anderson

[57] ABSTRACT

A circuit for color television which demodulates the chroma signal along two demodulator axes, that improvement where one demodulation axis is given a predetermined added lead angle and the second demodulation axis is given a predetermined added lag angle so that their separation is greater. Also in the improvement, the gain of the one demodulator is made relatively substantially less than the gain of the second demodulator. By changing the relative phase separation of the two demodulation axes and changing the relative gains of the two demodulators, colors demodulated from the chroma signal will be shifted, in the flesh range, toward a predetermined flesh color thereby providing desired flesh tone over a wide variety of transmitting conditions. The adjustments may also be made to the transmitting equipment to obtain the desired above advantage.

13 Claims, 4 Drawing Figures

INVENTOR.
JOHN M. KRESOCK
BY
Richard Seeger
ATTORNEY

INVENTOR.
JOHN M. KRESOCK
BY
Richard Kreger
ATTORNEY

INVENTOR.
JOHN M. KRESOCK
BY
Richard Seeger
ATTORNEY

APPARATUS FOR MODIFYING ELECTRICAL SIGNALS

A BRIEF SUMMARY OF INVENTION

It has been desired in the color television industry to provide a tranmission-reception system which tends to make flesh colors on the TV receiver in a desired range that are acceptable to TV viewers, thereby making unnecessary, or less necessary, adjustments in the hue control as the receiver is switched from channel to channel or when different cameras or program material are used on the same channel.

This invention provides acceptable flesh color under a wide range of conditions by modifying the transmission and/or receiving equipment. The demodulators in the receiver may be modified to obtain modified components from the chroma signal by spreading the angle between the axes in the respective demodulators so that, in a preferred embodiment described below, the one axis is changed by adding 3° and the second axis is changed by subtracting 15°. These become the D and E axes respectively as shown in FIG. 4. Further, the demodulator gain along the E axis is made smaller by a factor of 1.5 or is decreased to of its initial value. In this way, in a predetermined sector of the color diagram, the chrominance signals represented by a vector lagging a desired flesh color vector, e.g., at 123°, will be given a leading correction and chrominance signals represented by a vector leading the desired flesh vector will be given a lagging correction. While angles of or gains along demodulator axes have been altered for many years prior to this invention to compensate for various deficiencies and problems, this invention is the first to change both the angles of and gains along the demodulator axes to accomplish flesh tone correction.

These and other advantages will become more apparent when a preferred embodiment is considered in connection with the following drawings.

DETAILED DESCRIPTION

Figure 1:
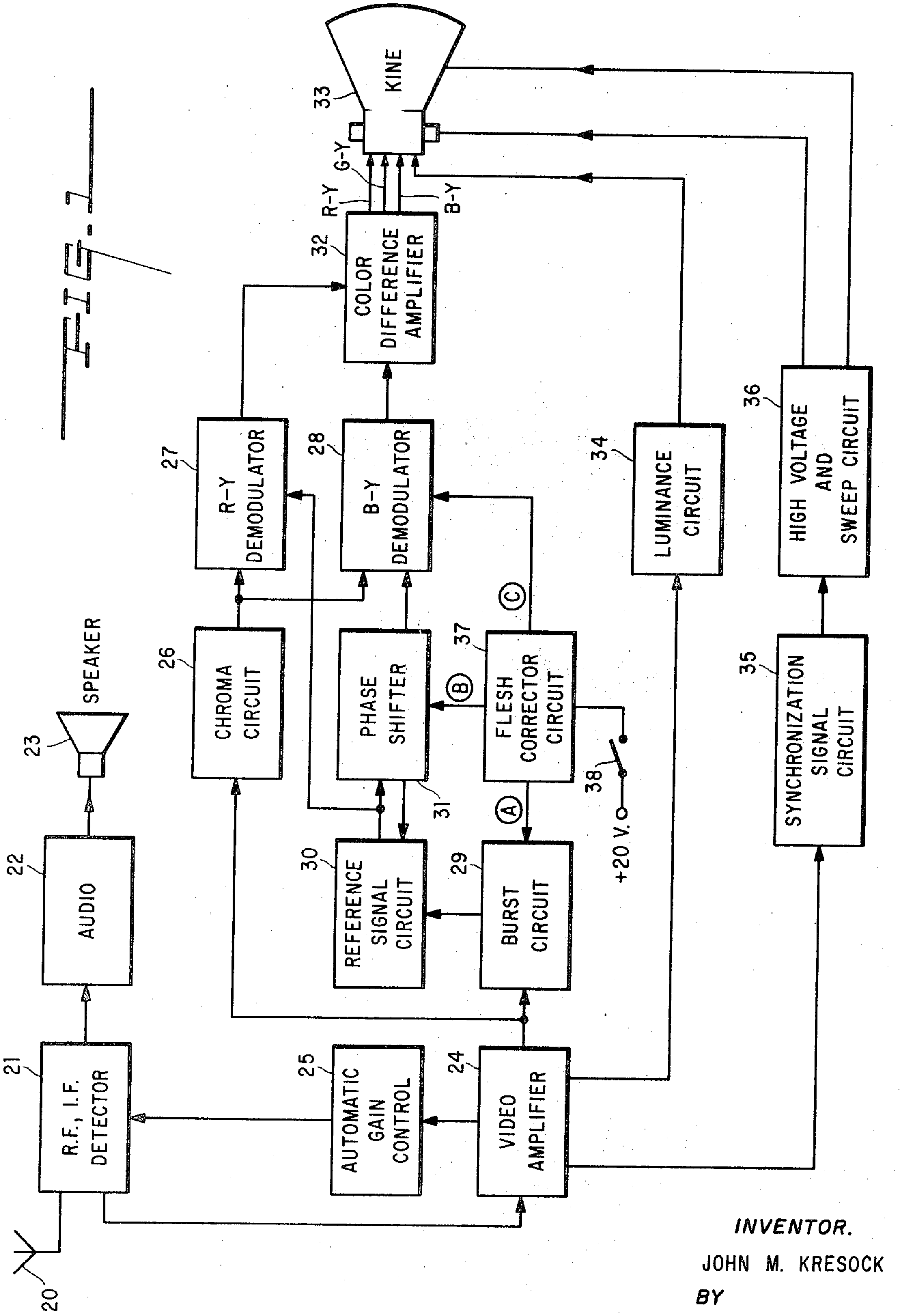
FIG. 1 is a block diagram of a preferred embodiment of this invention.
Figures 3, 4:
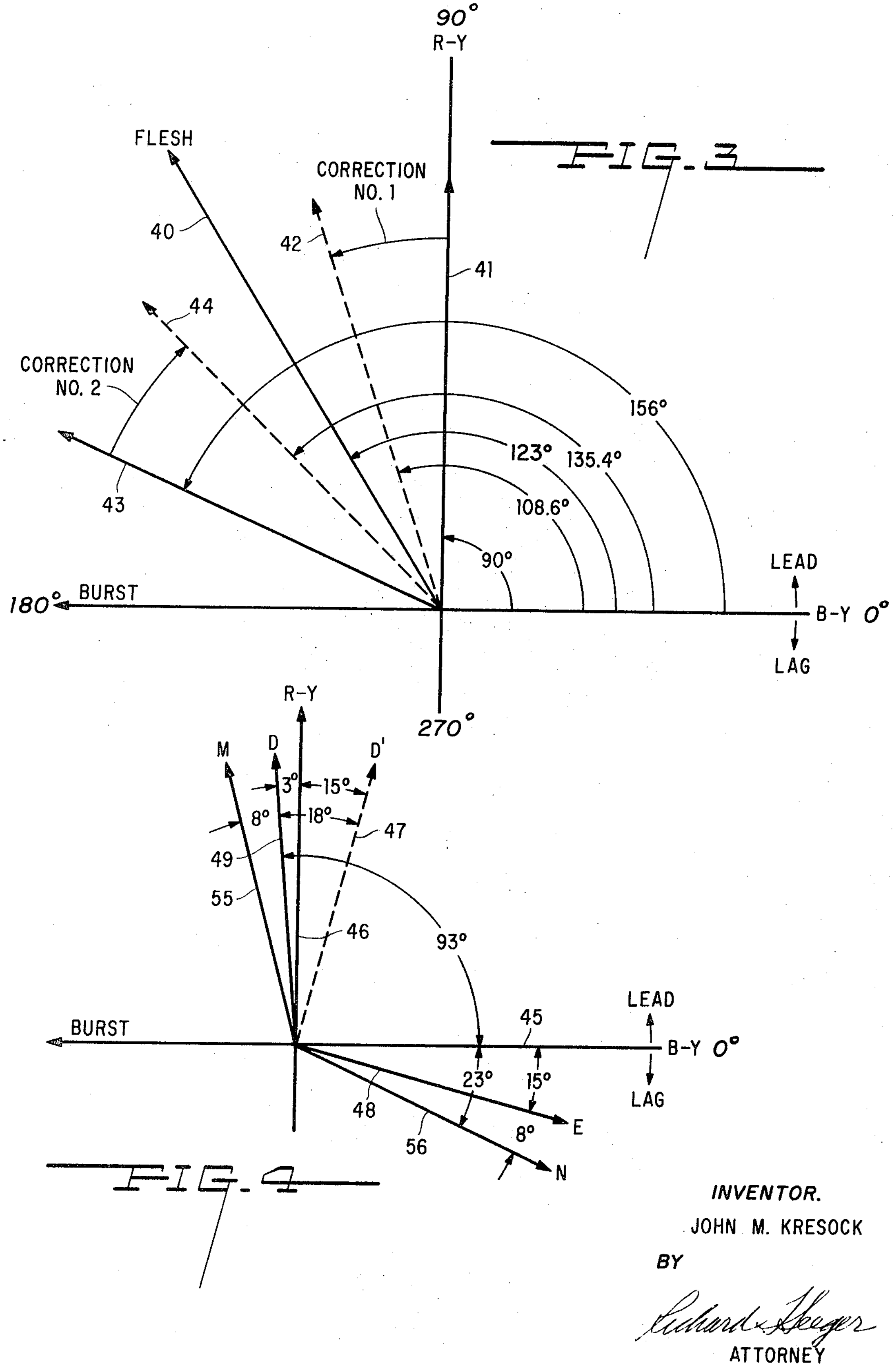
FIG. 3 is a vector diagram showing typical vector corrections obtained by the circuits shown in FIGS. 1 and 2.
FIG. 4 is a vector diagram showing the changes to color demodulation axes.

In FIG. 1 is shown a block diagram of a color television receiver utilizing the principles of this invention. The following embodiment was incorporated into a Magnavox T920 color television chassis as described in Magnavox Service Manual 7288. Antenna 20 provides a signal to RF and IF detector stages 21 which provides a signal to the audio circuitry 22 and loudspeaker 23 and also to the video amplifier 24 from which a signal is provided to automatic gain control circuitry 25 and fed back to detectors 21 in the conventional manner. From video amplifier 24 the signal is sent to circuit 26 and from there the chrominance signal is sent to R-Y demodulator 27 and B-Y demodulator 28. The chroma signal from video amplifier 24 is also sent to burst circuit 29 which sends a signal during color reception to reference signal circuit 30, which in turn sends a reference signal to R-Y demodulator 27 and phase shifter 31 where the signal is shifted approximately 90° lagging and then sent to B-Y demodulator 28. In many color television sets today, the chrominance signal is demodulated along R-Y and B-Y axes with the R-Y axis at 90° and the B-Y axis at 0°, as shown in FIGS. 3 and 4.

From the R-Y and B-Y demodulators 27, 28 R-Y and B-Y signals are sent to color difference amplifiers 32 where they are amplified and matrixed to form three signals, one representing G-Y, one representing R-Y but along a demodulation axis leading the demodulation angle of R-Y demodulator 27 by 8°, and one representing B-Y but along a demodulation axis lagging the demodulation angle of B-Y demodulator 28 by 8°. The resultant color difference signals are then sent to kinescope 33.

Also from video amplifier 24, the luminance signal is sent to luminance circuit 34 where it is further processed and sent to kinescope 33 in the conventional manner. video amplifier 24 also sends a signal to synchronization signal circuit 35 which sends a signal to high voltage and sweep circuit 36. Circuit 36 sends control signals to kinescope 33 to control the horizontal and vertical deflection elements, and provides the high voltage signal to the accelerating element, also in the conventional manner.

FLESH CORRECTOR CIRCUIT 37

This invention provides flesh corrector circuit 37 for the receiver of FIG. 1, which, when switch 38 is closed, provides corrections to the received signals to provide more normal looking flesh tones. When switch 38 is open, the receiver operates in the conventional manner. When switch 38 is closed, circuit 37 provides changes in the angle of the R-Y and B-Y demodulation axes through Line A to burst circuit 29; provides an additional change in the angle of the R-Y demodulation axis through Line B to phase shifter 31; and provides a signal through Line C to B-Y demodulator 28 which reduces the amplitude of the B-Y demodulator output signal for any given color.

Referring to FIG. 3, the effect of the signals in Lines A, B, and C can be seen. As is conventional, a signal conveying chrominance information characteristic of a flesh color may be represented as a vector leading the B-Y axis by 123°, as shown in the color vector diagram of FIG. 3. A received chrominance signal represented by a vector 41 at 90° will be typically corrected to a vector 42 having an angle of 108.6° thereby resulting in a lead correction of 18.6°, while a received chrominance signal represented by a vector 43 at 156° is typically corrected to a vector 44 at 135.4°, a lag correction of 20.6°.

Figure 2:
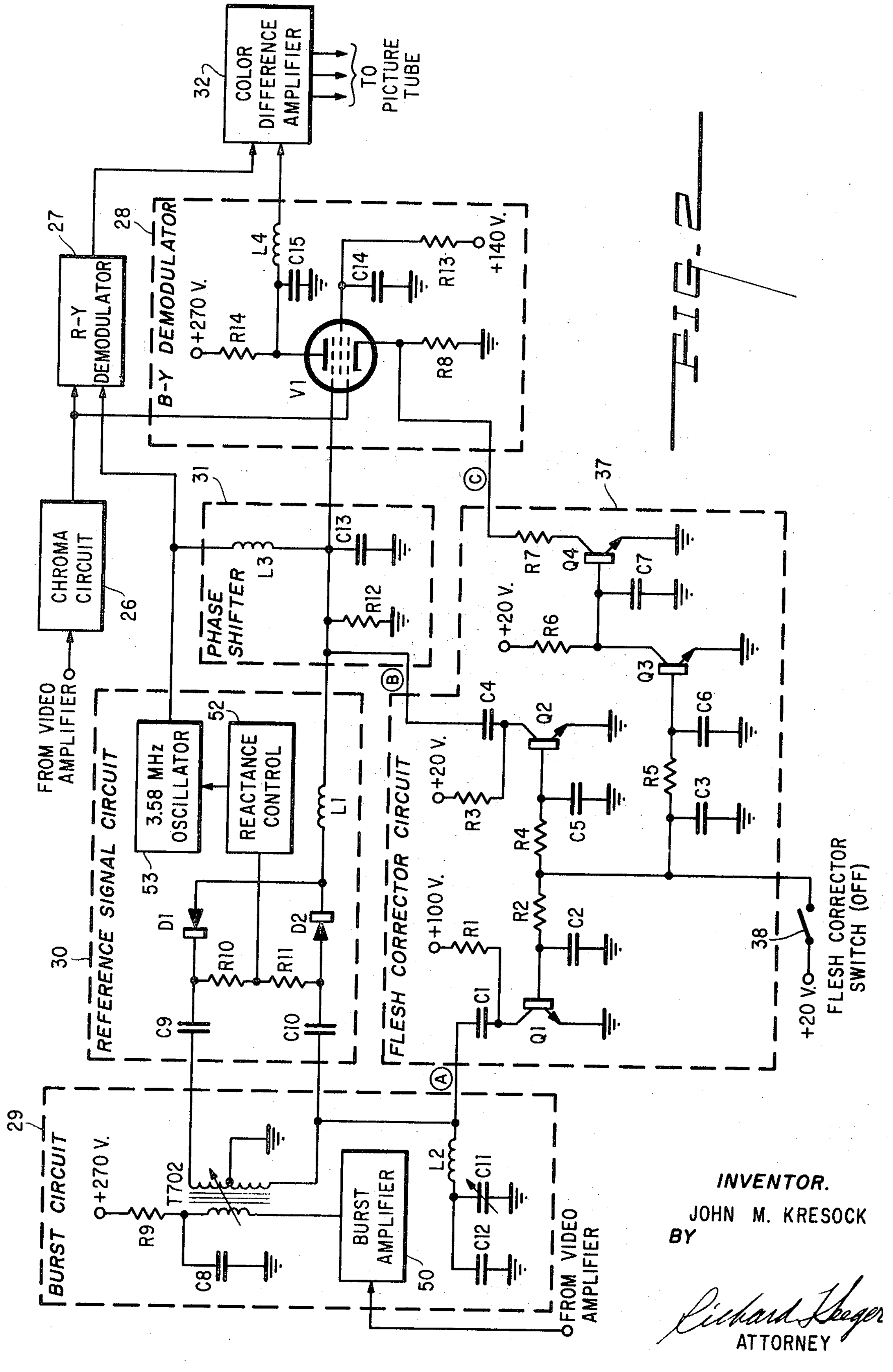
FIG. 2 is schematic diagram of certain portions of FIG. 1, showing in more detail the components thereof.

The operation of flesh corrector circuit 37, FIG. 2, is controlled by the position of switch 38 which may conveniently appear on the control panel of the TV receiver. Switch 38 when closed connects a 20 volt DC supply to circuit 37 and supplies a signal to the bases of transistors Q1, Q 2, and Q 3 to cause these transistors to conduct to saturation. The 20 volt supply is connected to the bases of transistors Q 1, Q 2, and Q 3 respectively through current limiting resistors R 2, R 4, and R 5 with capacitors C 2, C 5, and C 6 being AC bypass capacitors for the bases of transistors Q 1, Q 2, and Q 3 respectively. Capacitor C 3 is an AC bypass capacitor for flesh corrector switch 38. R 1, and R 3 provide collector bias for transistors Q 1, and Q 2, respectively, from voltage sources of 100 volts, and 20 volts respectively. R 6 is the base current limiting resistor from a 20 volt supply for the base of transistor Q 4. C 7 is the AC bypass capacitor for the base of transistor Q 4.

When switch 38 is closed, transistor Q 1 is biased to saturation adding capacitor C 1 to the secondary circuit of burst transformer T-702. This, in effect, causes the burst voltage phase to circuit 30 to lag by 15° thereby shifting the R-Y and B-Y demodulation axes 15° in a lag direction to axes D′ and E in FIG. 4.

Also, when switch 38 is closed, transistor Q 2 is biased to saturation, thereby putting capacitor C 4 into the phase shifter 31 circuit which creates an 18° lead in the signal applied to demodulator 27, shifting axis D′ to axis D in FIG. 4, causing a spread of 108≅ between the D and E axes. Amplifier 32 matrixes the color difference signals to effectively add 8° to D axis to obtain M axis and subtracts 8° from the E axis to obtain the N axis. This may be seen in FIG. 4 where vectors 45, 46 are the B-Y, R-Y axes respectively, vectors 47, 48 are the D′, E demodulator axes after being retarded by the lag provided by C 1, vector 49 is the D vector after being advanced by the lead provided by C 4, and vectors 55, 56 are the M and N vectors respectively.

Further, closing switch 38 causes transistor Q 3 to saturate lowering the voltage to the base of transistor Q 4 sufficiently to turn Q 4 off, in effect removing R 7 from the cathode circuit of V 1 in B-Y demodulator 28 increasing the cathode resistance, decreasing the gain of the demodulator 28 and reducing the magnitude of the E demodulator axis output signal.

Burst amplifier 50 of conventional design receives the signal from video amplifier 24 and the plate of the burst amplifier is connected to burst transformer T-702 with resistor R 9 being the plate supply decoupling resistor and capacitor C 8 being the plate supply bypass capacitor. Variable capacitor C 11 is the hue control and may be varied at the control panel of the TV receiver to vary the phase of the burst signal to reference signal circuit 30 and C 12 is the cable capacitance of the cable connecting hue control C 11 to the burst circuit 29. L 2 is a tweet and harmonic suppressing choke. When flesh corrector switch 38 is in the open or off position, as shown, burst circuit 29 operates in a conventional manner to supply a color burst signal to reference signal circuit 30, the phase of the signal depending upon the received burst phase and the position of C 11.

IMPARTING LAG TO R-Y AND B-Y DEMODULATOR SIGNALS TO OBTAIN D', E IN FIG. 4

The closing of switch 38 causes transistor Q 1 to conduct which in effect places the capacitance of C 1 in the secondary circuit of the burst transformer T-702. This imparts 15° of voltage phase lag to the burst signal applied to the reference signal circuit components, including capacitances C 9, C 10, and resistances R 10, R 11, and diodes D 1, D 2 which form an automatic phase control phase detector, the output of which is connected to reactance control 52. Reactance control 52 provides a phase and frequency control signal to 3.58 mHz oscillator 53 causing the oscillator to operate at a phase and frequency nominally in synchronism with the phase and frequency of the chrominance subcarrier at the transmitter. However, the phase of the voltage signal from oscillator 53 is given a lag of 15° when switch 38 is closed due the inclusion of capacitor C 1 in the secondary circuit of the transformer T-702.

Oscillator 53 is connected to R-Y demodulator 27 to provide a reference signal which in effect controls the position of the R-Y demodulator axis and also is applied through phase shifter 31 which applies 90° of lag to the reference signal before it is applied to the B-Y demodulator.

Phase shifter 31 causes a predetermined amount of phase difference between the R-Y demodulation axis and the B-Y demodulation axis by means of inductance L 3, capacitance C 13, and resistance R 12 and in this embodiment the amount of B-Y lag is 90°.

In FIG. 4, vectors D' and E show the lag that capacitor C 1 provides to the R-Y and B-Y axes respectively.

LEAD CORRECTION TO R-Y AXIS TO OBTAIN D IN FIG. 4

When switch 38 is closed, transistor Q 2 is biased to saturation in effect putting capacitor C 4 into the phase shift circuit of phase shifter 31. This immediately in effect introduces an additional 18° of lag to the reference signal for B-Y demodulator 28, due to the fact that C 4 tends to change the resultant of impedance R 12 and L 3 to make current more lagging and the voltage developed across C 4, R 12, and C 13 cause the voltage of Line B to be more lagging. However, due to the closed loop nature of the receiver and the fact that B-Y reference signal is also the color sync phase detector 3.58 mHz CW reference, the R-Y and B-Y reference signals are almost simultaneously given an 18° lead correction bringing E back to −15° and placing D at 93°, thereby causing a spread between D and E vectors (FIG. 4) of 108°. The vectors D and E can be achieved in numerous other ways using the teaching of this invention and also their position can be changed according to the correction desired whether for flesh or various other corrections.

The amplifier 32 adds 8° from E axis to obtain M axis 55 at 101° and subtracts 8° from E axis to obtain N axis 56 at −23° for an effective spread between the M and N demodulator axes of 124° as shown in FIG. 4.

E AXIS COMPONENT AMPLITUDE CHANGE

When flesh corrector switch 38 is closed, transistor Q 3 is biased into conduction causing the voltage on the base of transistor Q 4 to fall sufficiently to turn Q 4 off. This in effect takes R 7 out of the cathode circuit of tube V 1 in B-Y demodulator 28. Capacitor C 14 is a screen bypass capacitor and resistance R 13 is a screen decoupling resistor for tube V 1. R 14 is a plate load resistor for V 1 and inductor L 4 and capacitance C 15 form a filter circuit to minimize the 3.58 mHz signal from the plate of V 1 and to form a 500 KHz bandpass circuit.

As mentioned, closing of switch 38 will remove R 7 from the cathode circuit of tube V 1 thereby increasing the cathode resistance to the value of R 8 and increasing the cathode degeneration thereby reducing the amplitude of the component along the E axis by a factor of 1.5 or 33 percent for the values of this particular circuit which are given below. By reducing the E component amplitude, in effect the E component of any color signal will be less effective in determining the resultant color vector and this is desired in this instance to cause the vectors to assume the corrections as shown in FIG. 3.

As mentioned, in a predetermined sector color vectors which lag the flesh axis are given a lead correction and color vectors which lead the flesh vector are given a lag correction. Color vectors along the flesh axis demodulated not substantially changed in phase. Each color vector is demoudlated into its components at phases leading the R-Y axis and lagging the B-Y axis. However, color difference amplifiers 32 and kinescope 33 treat those components as if they were taken on the R-Y and B-Y axes. The R-Y demodulator axis is changed to a position D (FIG. 4) and B-Y demodulator axis is changed to a position E (FIG. 4) and its gain is reduced. In addition, color difference amplifier 32 adds 8° to D axis to form the M axis and subtracts 8° from the E axis to form the N axis. For some color vectors, the hue alterations created by these changes are in opposite directions and do cancel to a degree, but due to placement of the M and N axes and the decrease in amplitude or gain along the N axis, corrections to most color vectors in approximately the 67° to 191° sector, whether they lead or lag the desired flesh vector (123°), are toward the desired flesh vector. Also as the color vector moves in a clockwise direction away from the flesh vector 40 and approaches approximately 67°, the further the color vector lags the desired flesh vector, the greater will be the M component relative to the N component and the greater will be the magnitude of leading correction of the resultant towards the flesh vector. When the color vector passes approximately 67°, the ratio of the M component to the N component becomes smaller so that the lead correction becomes smaller and therefore the correction gradually diminishes, avoiding the abrupt change in color when the color vector moves only a small amount.

As the color vectors which lead the flesh vector (123°) approach approximately 191° in a counterclockwise direction away from flesh vector 40 on the diagram of FIG. 3, the ratio of the N component to the M component of such vectors continues to grow larger but after approximately 191°, the ratio between N and M components becomes smaller. This means that the magnitude of the lag correction for colors leading the flesh vector continues to become greater until approximately 191° point is reached, after which the magnitude of the correction gradually diminishes so that there are no abrupt changes of correction.

The D and E axes and the gain reduction in E are selected such that chrominance signals represented by vectors near but along the flesh axis will not be substantially changed in phase.

Chrominance signals represented by vectors near but lagging flesh will have a more negative E component than their corresponding components on the B-Y axis and the component on the D axis is substantially the same as the R-Y component. Therefore, these chrominance signals will be corrected in a leading direction.

Chrominance signals represented by vectors near but leading flesh in phase have a larger D component and a smaller E component after gain reduction, than the original R-Y and B-Y components respectively. Therefore, these chrominance signals will be corrected in a lagging direction.

It is understood that when a chrominance signal is demodulated into components along the D and E axes (FIG. 4), these components will be treated by the color difference amplifier 32 and kinescope 33 as if they were taken on the R-Y and B-Y axes. The circuitry including color difference amplifier 32 and kinescope 33 is not changed by the closing of switch 38. As mentioned, color difference amplifier effectively adds 8° to the R-Y demodulation axis and subtracts 8° from the B-Y axis. If desired, the demodulation axis changes of this invention could be effected in amplifier 32 or elsewhere in the circuit. Further, in some instances it may be desirable to provide receivers which in effect have a permanently closed switch 38.

The G-Y signal is generated in color difference amplifier 32 in accordance with the following equation:

$$G-Y=-0.51(R-Y)-0.19(B-Y)$$

Therefore, when R-Y and B-Y are modified by closing switch 38, G-Y is also modified according to the above equation. On FIG. 3, the G-Y modification is included in the corrected color vectors 42, 44.

The foregoing circuitry may be used with the sepia color circuit of the Magnavox T-920 chassis above referred to for particular results.

This invention may also be applied to a television transmitting station by modifying the chroma signal in a manner which changes the I and Q modulation to correct colors in the flesh area.

In the above circuit, the following component values were used to obtain a lead correction of 3° to the R-Y axis, lag correction of 15° to the B-Y axis, and a gain reduction correction factor of 1.5 or 33 percent to the B-Y axis:

| | |
|---|---|
| C- 1 | 18 pf |
| C- 2 | 0.01 uf |
| C- 3 | 0.05 uf |
| C- 4 | 51 pf |
| C- 5 | 0.05 uf |
| C- 6 | 0.05 uf |
| C- 7 | 0.1 uf |
| C- 8 | 0.01 uf |
| C- 9 | 330 pf |
| C-10 | 330 pf |
| C-11 | 72 of max. (variable capacitor) and |
| C-12 | cable capacitance |
| C-13 | 200 of |
| C-14 | 470 pf |
| C-15 153 | 24 pf |
| L- 1 | 5.6 uh |
| L- 2 | tweet and harmonic suppression choke |
| L- 3 | 10 uh |
| L- 4 | 620 uh |
| R- 1 | 1 megohms |
| R- 2 | 10 K-ohms |
| R- 3 | 1 megohms |
| R- 4 | 10 K-ohms |
| R- 5 | 3900 ohms |
| R- 6 | 3900 ohms |
| R- 7 | 270 ohms |
| R- 8 | 160 ohms |
| R- 9 | 1000 ohms |
| R-10 | 1 megohms |
| R-11 | 1 megohms |
| R-12 | 270 ohms |
| R-13 | 56 ohms |
| R-14 | 4.7 K-ohms |
| V- 1 | 6 GY6 |
| Q -1 | MF 420 |
| Q- 2 | SE 5025 |
| Q- 3 | SE 5025 |
| Q- 4 | SE 5025 |

It will be understood that modifications and variations may be effected without departing from the spirit and scope of the novel concepts of this invention.

I claim:

1. In a color television system, apparatus for processing a color television chrominance signal comprising:
   - reference signal means for supplying A fixed frequency reference signal at a nominally predetermined phase;
   - chrominance channel means for supplying a chrominance signal bearing information in the form of sideband components of a carrier wave at said fixed frequency;
   - detection means coupled to said reference signal means and said chrominance channel means for detecting the components of said chrominance signal located at a plurality of phases relative to said nominally predetermined phase, each of said plurality of phases having a predetermined phasic displacement from the remainder of said plurality of phases;
   - circuit means for switchably altering the phasic displacement of at least one of said plurality of phases from at least one other of said plurality of phases and for altering the amplitude of one of said detected components relative to at least one other of said detected components; and
   - utilization means coupled to said detection means for utilizing said detected components.

2. In a color television system, apparatus for processing a color television chrominance signal comprising:
   - reference signal means for supplying a fixed frequency reference signal at a nominally fixed phase;
   - chrominance channel means for supplying a chrominance signal bearing color difference information in the form of sideband components of a carrier wave at said fixed frequency;
   - first chrominance signal detection means;
   - second chrominance signal detection means;
   - coupling means for coupling said reference signal means and said chrominance channel means to said first and second chrominance signal detection means, said first chrominance signal detection means detecting a first component of said chrominance signal located at a first phase relative to said nominally fixed phase and said second chrominance signal detection means detecting a second component of said chrominance signal located at a second phase relative to said nominally fixed phase, said second phase having a predetermined phase relationship to said first phase;

circuit means for switchably altering said predetermined phase relationship and the relative amplitudes of said first and second detected components; and color signal utilization means coupled to the outputs of said first and second chrominance signal detection means.

3. In a color television system, apparatus for processing a chrominance signal and enhancing the resultant flesh tones comprising:

reference signal means for supplying a fixed frequency reference signal at a nominally fixed phase;

chrominance channel means for supplying a chrominance signal bearing information in the form of sideband components of a carrier wave at said fixed frequency;

detection means coupled to said reference signal means and said chrominance channel means for detecting first and second components of said chrominance signal located at first and second phases relative to said nominally fixed phase, said second phase having a predetermined phase relationship to sad first phase and said second component having a predetermined amplitude relationship to said first component;

color signal utilization means coupled to the output of said detection means for utilizing said first and second detected components; and means for altering said predetermined phase and amplitude relationships.

4. In a color television system, apparatus for processing a chrominance signal and enhancing the resultant flesh tones comprising:

reference signal means for supplying a fixed frequency reference signal at a nominally fixed phase;

chrominance channel means for supplying a chrominance signal bearing information in the form of sideband components of a carrier wave at said fixed frequency;

color signal utilization means for utilizing first and second detected components of said chrominance signal, said first and second detected components being located at first and second phases relative to said nominally fixed phase, said second phase being displaced from said first phase by a predetermined phase angle, and said first and second detected components having a predetermined amplitude relationship;

detection means coupled to said reference signal means and said chrominance channel means for supplying third and fourth detected components of said chrominance signal to said color signal utilization means, said third and fourth components being located at third and fourth phases relative to said nominally fixed phase, said fourth phase being displaced from said third phase by a phase angle other than said predetermined phase angle, and said third and fourth detected components having an amplitude relationship other than said predetermined amplitude relationship.

5. In a color television system, apparatus for processing a color television chrominance signal comprising:

reference signal means for supplying a fixed frequency reference signal at a nominally fixed phase;

chrominance channel means for supplying a chrominance signal bearing information in the form of sideband components of a carrier wave at said fixed frequency;

first detection means coupled to said reference signal means and said chrominance channel means for detecting a first component of said chrominance signal located at a first phase relative to said nominally fixed phase;

second detection means coupled to said reference signal means and said chrominance channel means for detecting a second component of said chrominance signal located at a second phase relative to said nominally fixed phase, said second phase having a predetermined phasic displacement from said first phase;

first circuit means for switchably altering said predetermined phasic displacement;

second circuit means for switchably altering the relative amplitudes of said first and second detected components; and color signal utilization means coupled to the output of said first and second detection means.

6. In a color television system, apparatus for processing a color television chrominance signal comprising:

reference signal means for supplying a fixed frequency reference signal at a nominally fixed phase;

chrominance channel means for supplying a chrominance signal bearing information in the form of sideband components of a carrier wave at said fixed frequency;

first detection means coupled to said chrominance channel means for detecting a first component of said chrominance signal at the phase of a signal of said fixed frequency applied to it;

second detection means coupled to said chrominance channel means for detecting a second component of said chrominance signal at the phase of a signal of said fixed frequency applied to it;

coupling means for coupling said reference signal means to said first and second detection means and supplying signals of said fixed frequency in a predetermined phasic relationship to said first and second detection means;

circuit means for switchably altering said predetermined phasic relationship and the relative amplitudes of said first and second detected components; and color signal utilization means coupled to the output of said first and second detection means.

7. In a color television receiver equipped to receive a color television signal including a burst signal at a fixed frequency and a nominally fixed phase and a chrominance signal bearing chrominance information in the form of sideband components of a carrier wave at said fixed frequency, apparatus for processing said chrominance signal and enhancing the flesh-tones produced by said receiver comprising:

reference signal means for supplying a continuous wave reference signal at said fixed frequency and at a phase having a predetermined relation to said nominally fixed phase;

chrominance channel means for supplying said chrominance signal;

first detection means coupled to said reference signal means and said chrominance channel means for detecting a first component of said chrominance signal located at a first phase relative to said nominally fixed phase;

second detection means coupled to said reference signal means and said chrominance channel means for detecting a second component of said chrominance signal located at a second phase relative to said nominally fixed phase having a predetermined phasic displacement from said first phase;

circuit means for switchably altering said predetermined phasic displacement between said first and second phases and the relative amplitudes of said first and second detected components; and color signal translation and display means coupled to the output of said first and second detection means for utilizing said first and second detected components in the generation of a color television picture.

8. The color television receiver apparatus of claim 7, said circuit means having a first state wherein said first phase lags said nominally fixed phase by a first phasic displacement of approximately 90° and said second phase lags said first phase by a second phasic displacement of approximately 90° and a second state wherein said second phase lags said first phase by a phasic displacement greater than said second phasic displacement.

9. The color television receiver apparatus of claim 8 wherein the ratio of the relative magnitudes of said first and second detected components is a first value when said circuit means is in said first state and said ratio is a second value greater than said first value when said circuit means is in said second state.

10. The color television receiver apparatus of claim 7, said circuit means having a first state wherein said first phase lags said nominally fixed phase by a first phasic displacement of approximately 90° and said second phase lags said nominally fixed phase by a second phasic displacement of approximately 180° and a second state wherein said first phase lags said nominally fixed phase by a phasic displacement less than said first phasic displacement and said second phase lags said nominally fixed phase by a phasic displacement greater than said second phasic displacement.

11. The color television receiver apparatus of claim 10 wherein the ratio of the relative magnitudes of said first and second detected components is a first value when said circuit means is in said first state and the ratio of the relative magnitudes of said first and second detected components is a second value greater than said first value when said circuit means is in said second state.

12. The color television receiver apparatus of claim 7 wherein said circuit means is operative to alter the phase of the reference signal applied to at least one of said first or second detection means.

13. The color television receiver apparatus of claim 7 wherein said color signal translation and display means comprises matrix means coupled to said first and second detection means for combining said first and second detected components to derive a third detected component of said chrominance signal at a third phase relative to said nominally fixed phase and a fourth detected component of said chrominance signal at a fourth phase relative to said nominally fixed phase.

* * * * *

UNITED STATES PATENT OFFICE
CERTIFICATE OF CORRECTION

Patent No. 3,654,384 Dated April 4, 1972

Inventor(s) John M. Kresock

It is certified that error appears in the above-identified patent and that said Letters Patent are hereby corrected as shown below:

Column 2, line 6, "video" should be "Video";

Column 2, line 51, The comma (,) should be omitted after "R1"

Column 2, line 52, The comma (,) should be omitted after "Q 1'

Column 4, line 3, "from E axis" should be "to the D axis";

Column 4, line 35, Delete "demodulated" and insert -- are --;

Column 5, line 2, Delete "near but";

Column 5, line 29, "-0.19(B-Y)" should be "-.19(B-Y)";

Column 5, line 67, "C-13 200 of" should be "C-13 200 pf";

Column 5, line 70, "C-15 153" should be "C-15"; and

Claim 3, line 25 "sad" should be "said".

Signed and Sealed this

Twenty-first Day of December 1976

[SEAL]

*Attest:*

RUTH C. MASON
*Attesting Officer*

C. MARSHALL DANN
*Commissioner of Patents and Trademarks*